(No Model.)
S. H. SHORT.
OPERATING MECHANISM FOR CURRENT REGULATORS.
No. 456,253. Patented July 21, 1891.
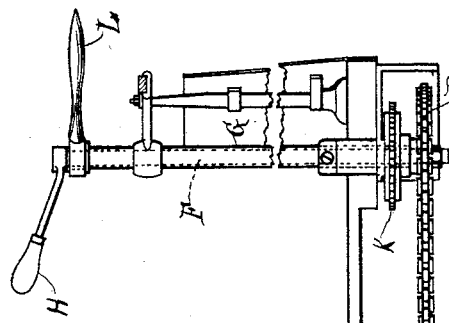
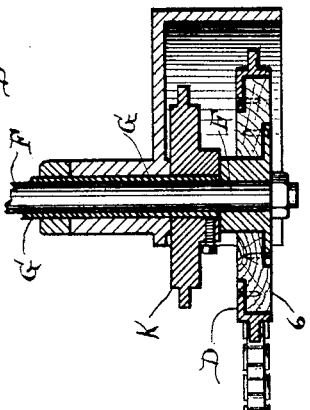
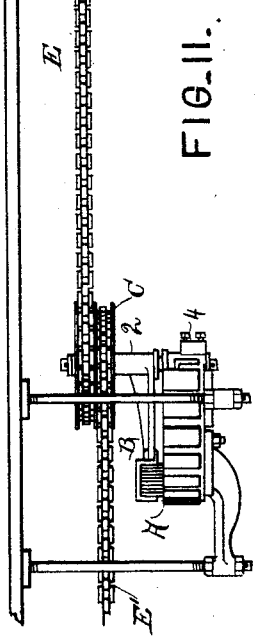
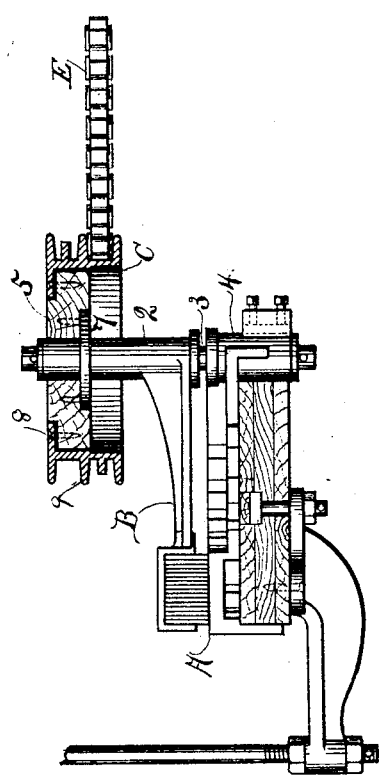
FIG. I.
FIG. II.
Witnesses
R. E. Auld
G. F. Downing
Inventor
Sidney H. Short
By H. A. Seymour
Atty.

UNITED STATES PATENT OFFICE.

SIDNEY H. SHORT, OF CLEVELAND, OHIO.

OPERATING MECHANISM FOR CURRENT-REGULATORS.

SPECIFICATION forming part of Letters Patent No. 456,253, dated July 21, 1891.

Application filed March 10, 1891. Serial No. 384,447. (No model.)

*To all whom it may concern:*

Be it known that I, SIDNEY H. SHORT, of Cleveland, in the county of Cuyahoga and State of Ohio, have invented certain new and useful Improvements in Operating Mechanism for the Current-Regulators of Electric Cars; and I do hereby declare the following to be a full, clear, and exact description of the invention, such as will enable others skilled in the art to which it appertains to make and use the same.

This invention relates more particularly to the means whereby the rheostatic current-regulators on electric cars are operated from a stand on each of the car-platforms under the control of the motor-man; but each of the improvements constituting the said invention is included for all the uses to which it may be adapted.

In the accompanying drawings, which form part of this specification, Figure I is a partial view of a current-regulator provided with operating mechanism in accordance with the invention, and Fig. II is a partial sectional view of the same.

A is the contact-board of the car-rheostat, and B the switching-arm which travels over said board to make and break the circuit or to connect in more or less of the resistances of the rheostat. The hub 2 of the arm B is shown as turning on a stud 3, which is held in the casting 4, to which the wire from the trolley is connected. The switch-arm B is operated through two wheels C and D and an intermediate chain E. Both wheels are made with webs 5 and 6, respectively, of non-conducting material, such as wood, so as to insulate the arm B effectually from the shaft F, on which the wheel D is fixed. This shaft F passes through a hollow shaft or sleeve G and is turned by means of the handle H. The sleeve G is provided with a sprocket-wheel K for operating the reversing-switch, (not shown,) and is turned by the handle L.

It is evident that one of the wheels C D only might be provided with the non-conducting web, and also that the other wheel could be replaced by an appropriate substitute, and the invention extends to each of these arrangements, although it is better to use two wheels each with an insulating-web, and such arrangement is specially included in the invention. So far as I am aware, operating mechanism employing a chain and provided with means whereby the regulator is insulated from the shaft turned by the motor-man is new, and such mechanism in general is included in the invention.

The wheel C belonging to the arm B could be made with its individual hub, as shown for the wheel D, but the building of the wheel C directly on the hub 2 of the switch-arm constitutes a special improvement. To this end the hub 2 is provided with a flange 7, to which the web 5 is bolted. Said web is also bolted to the flange 8 on the rim 9 of the wheel C. The web 6 of the wheel D is bolted to a flange on its hub and a flange on its sprocketed rim.

A further improvement consists in making the rim of wheel C double and having a chain E or E′ run therefrom to each end of the car, so as to form an advantageous means for operating the current-regulator or rheostat from each end of the car.

Having fully described my invention, what I claim as new, and desire to secure by Letters Patent, is—

1. In combination with the current-regulator, operating mechanism comprising two wheels and an intermediate chain, each of said wheels being provided with a web of non-conducting material, substantially as described.

2. In combination with the current-regulator, operating mechanism comprising two wheels and an intermediate chain, one at least of said wheels being provided with a web of non-conducting material, substantially as described.

3. In combination with the current-regulator, operating mechanism comprising a wheel provided with a web of non-conducting material, a chain, and connecting means whereby the said regulator is operated through said chain and wheel, substantially as described.

4. In combination with the current-regulator, operating mechanism comprising a shaft to be turned by the motor-man, a chain, and insulating and connecting means whereby the regulator is operated through said shaft and chain, substantially as described.

5. The switching-arm provided with a hub, a flange on said hub, a web bolted to said flange, and a rim having a flange bolted to said web, substantially as described.

6. In combination with the current-regulator, operating mechanism comprising a double-rimmed wheel connected with the said regulator, a chain running to each end of the car, and a wheel at each end of the car engaging the corresponding chain, substantially as described.

In testimony whereof I have signed this specification in the presence of two subscribing witnesses.

SIDNEY H. SHORT.

Witnesses:
E. H. MORRISON,
A. B. CALHOUN.